Oct. 13, 1953        A. B. LOWE ET AL        2,655,274
CROP HARVESTING EQUIPMENT
Filed Oct. 31, 1949                          2 Sheets-Sheet 1
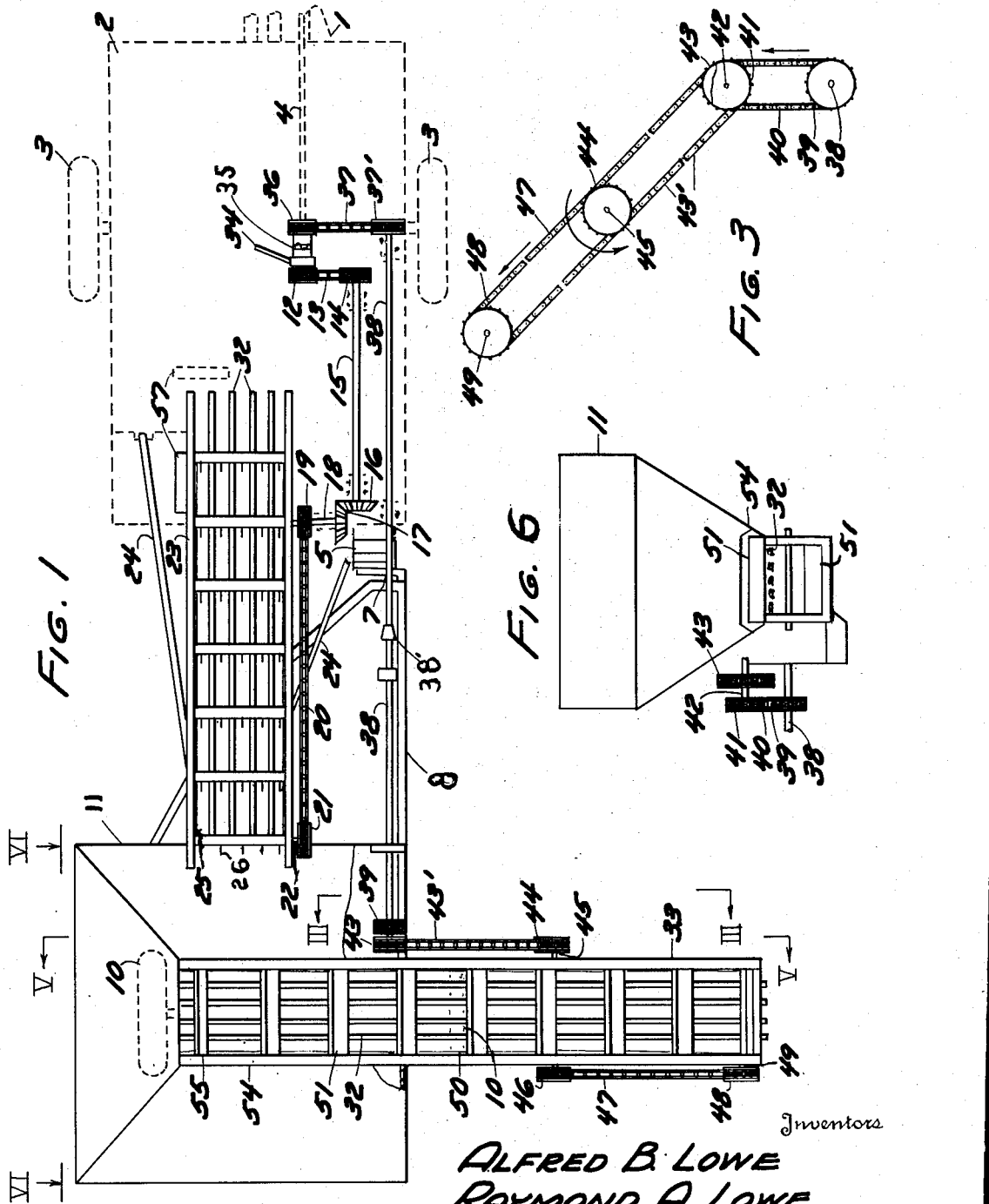
Inventors
ALFRED B. LOWE
RAYMOND A. LOWE
By
Geo E Kirk
Attorney

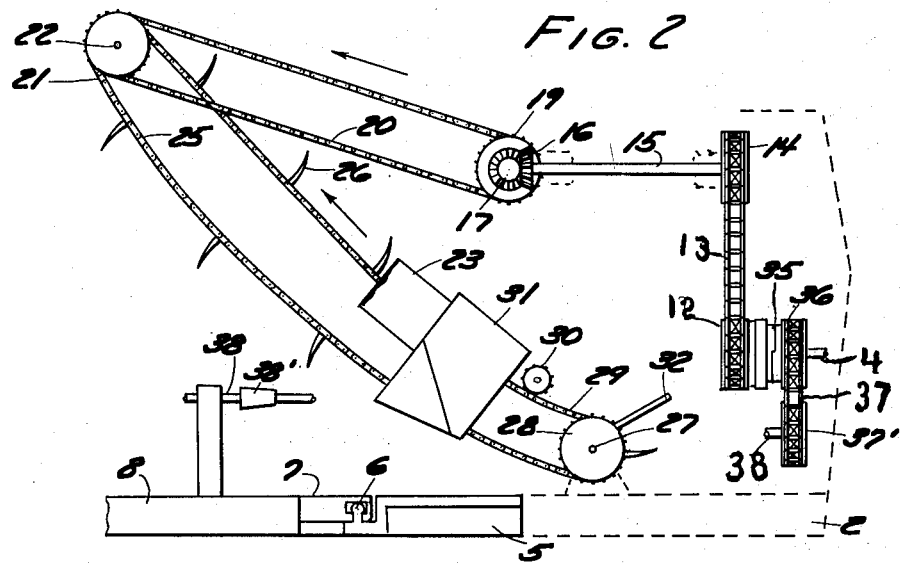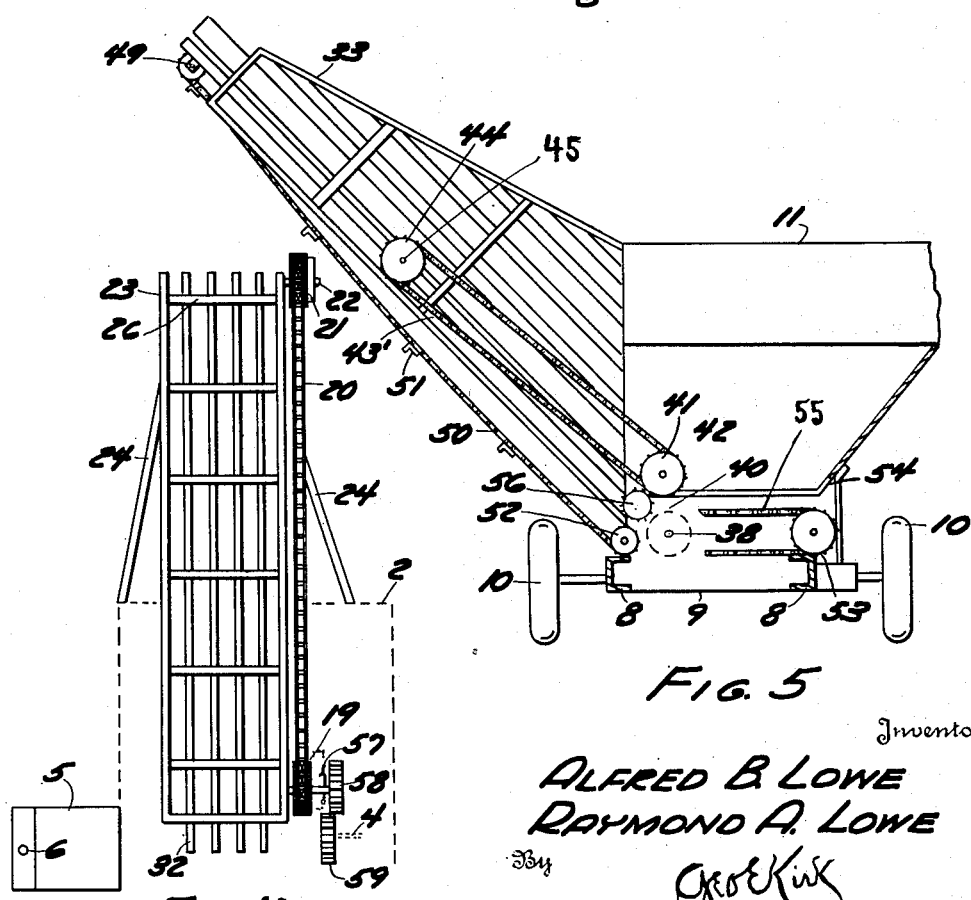

Patented Oct. 13, 1953

2,655,274

UNITED STATES PATENT OFFICE 2,655,274

CROP HARVESTING EQUIPMENT

Alfred B. Lowe and Raymond A. Lowe,
Oak Harbor, Ohio

Application October 31, 1949, Serial No. 124,556

1 Claim. (Cl. 214—42)

This invention relates to adaptation equipment, especially in conjunction with harvesting machines, as for root crops, such as sugar beets.

This invention has utility when incorporated in a multiple adaptable conveyor-elevator to receive a crop as being harvested, with selectable accumulator or trailer hopper cart of a self-unloading characteristic and manually controllable for the disposal of the gathered crop from the trailer.

Referring to the drawings:

Fig. 1 is a plan view of the elevator and cart in an operative series as trailing from a beet harvester, the latter being shown in dotted lines;

Fig. 2 is a side elevation of the transmission connections from the harvester to operate the elevator, in the assembly shown in Fig. 1;

Fig. 3 is a view from the line III—III, Fig. 1, of the drive for operating the self-unloader for the trailer cart, from a take-off or power connection on the harvester;

Fig. 4 is a plan view of the elevator, without the trailer, and disposed for the crop discharge to one side of the harvester, during the harvester progress, instead of rearwardly from the harvester, as shown in Fig. 1;

Fig. 5 is a side elevation of the hopper-trailer, from the line V—V, Fig. 1, a portion being broken away to show the location of the movable bottom conveyor section to effect the unloading of the unit; and Fig. 6 is a view from the line VI—VI, Fig. 1, showing the side of the hopper body opposite from that from which its discharge elevator-conveyor projects.

From a tractor there may be a trailer hitch 1 to a root crop harvester 2 having ground wheels 3. Additionally from the tractor there is a power take-off shaft 4.

To promote the carrying forward of the invention herein, an extension 5 is secured to the after portion of the harvester deck or frame. This extension is provided with a knuckle 6 for a trailer hitch 7 forming a pivot joint in coupling a forwardly extending arm or tongue 8 for a trailer base 9 having a pair of ground wheels 10. A hopper 11 is fixed on the trailer base 9. There is thus effected an assembly, in succession for across-a-field-to-be-subjected to crop harvesting therefrom, to be hauled by a tractor, said assembly comprising the harvester proper, and the hopper-equipped trailer.

*Harvester to hopper crop disposal*

The power take-off extension shaft section 4 from the tractor to the beet harvester 2, in its axial extent parallel to the direction for travel of the harvester 2 in operation, has at its after end a sprocket wheel 12. From the rear of the harvester 2 and looking forwardly at this wheel 12, its direction of rotation is clockwise. A sprocket chain 13 upward therefrom serves to drive a sprocket wheel 14 fixed with a shaft 15 upward from the deck of the harvester 2 and extending rearwardly to a bevel gear 16. This bevel gear 16 is in mesh with a bevel gear 17 on a fixed shaft 18. The shaft 18 has fixed thereon a sprocket wheel 19 from which extends a sprocket chain 20 to a sprocket wheel 21 on a shaft 22, rotatably mounted in the upward aft elevator frame 23 from which guy means or struts 24 extend forwardly to the harvester 2 in stabilizing the elevator frame 23 against shifting relatively to the shaft 18. Mounted in the frame 23 is an endless belt 25 or sprocket chain conveyor having flights 26.

Carried by the lower end of the elevator frame 23 mounted on the deck of the harvester 2, there is a shaft 27 with follower sprocket wheels 28 about which the descending lower reach of the conveyor 25 extends to have a relatively short horizontal reach portion 29 to a guide roller means 30 for the conveyor to take its upward inclined travel therefrom to the shaft 22. This conveyor section 29 is in position to have the sugar beet body dropped thereupon, as the beet top is cut therefrom and such beet top then released to a chute 31, and thereby be deflected to fall clear of the conveyor 25. The conveyor ascent is thus selectively for the beet root, while loose earth which may still be therewith may be joggled loose between guide rods 32 over which the conveyor flights 26 ride toward the shaft 22. During the travel of the harvester afield in removing the crop from the soil, as a continuous process therefrom, the topped and from-soil-freed beet roots are dropped from the aft upper end of the elevator conveyor 25, with flights 26, to fall into the hopper 11.

The crop gatherer

From the trailer hopper 11 there is shown extending laterally therefrom and upwardly inclined, a side slatted frame 33 coacting for self-unloading of the crop from the trailer. While this operation may occur to a truck moving along at the travel rate for the trailer, a believed preferred practice adopted is to await crop accumulation, or at a location, say at the end of the field. With the tractor not traveling and the harvester 2 and trailer hopper 11 standing, there may be dumping on the ground, into a bin or a truck in the vicinity of crop delivery from the frame 33.

A hand lever 34 may throw in a jaw clutch 35 to connect a sprocket wheel 36 normally loose on the power takeoff shaft section 4. Power transmission is thus effected thru a sprocket chain 37 to a sprocket wheel 37' fixed with a shaft 38 having at its rear end a sprocket wheel 39.

From the sprocket wheel 39 (Fig. 3) there extends upwardly an endless belt or sprocket chain 40 about a sprocket wheel 41 on a shaft 42. Additionally fixed to the shaft 42 is a sprocket wheel 43 from which there extends a sprocket chain 43' to a sprocket wheel 44 fixed on a shaft 45 extending crosswise of the underside of the frame 33 in the region of half way in its ascent. At the opposite side of the frame 33, there is fixed to the shaft 45 a sprocket wheel 46 with a sprocket chain 47 upward therefrom to a sprocket wheel 48 on a shaft 49 at the upper free end of the frame 33. There is as to the frame 33 an approach to transmission load balance for driving thru the shaft 49 conveyor chains 50 carrying flights 51 to ride on guide elements 32. The slack or descending reach of this endless conveyor 50 passes around a guide roll 52 to a follower sprocket 53 at the remote side of an open bottom 54 for the hopper 11. There is from the sprocket pair 53 a horizontal reach region 55 as a movable bottom for the hopper 11. This reach 55 is about a guide roll device 56 in locating the ascending reach of the conveyor 50 as a traveling floor in the frame 33 in directing discharge from the hopper 11 as the clutch 35 is thrown in by the lever 34.

The trailer hitch 6, 7, is readily detachable to clear the hopper trailer from the harvester. In the event there be not purpose to have the elevator conveyor 25, 26, direct the crop discharge aft, demountable connection means 57 for the frame 23 may be reset for say a 90° shift to discharge at one side, say at the left as in forward travel of the harvester 2, instead of at the right, say of the standing harvester 2 when the conveyor 50, with flights 51, is removing crop accumulation from the hopper 11. The demountable connection means 57, say of pillow block type have their bolt connections to the deck of the harvester 2 released to free the elevator for angular shifting. Upon locating the elevator in the desired shifted position, there is rebolting of the blocks or means 57 to the deck. For this reassembly of the conveyor 25, 26, there is eliminated use of the transmission thru the sprocket chain 13 to the bevel pinion 17, which has in lieu thereof a spur gear 58 in mesh with a spur gear 59 fixed on the shaft 4 in lieu of the sprocket wheel 12. At this angular shifted position, or changed mounting for the elevator, there may be location of the chain 28 on the opposite side of the elevator (Fig. 4) for actuation from the spur gear 58.

The harvester may be generally of the type shown in United States Letters Patent 2,331,520, especially as to the tractor haulage therefor and a power takeoff thereto from the tractor wherein under the disclosure herein the shaft 38 has a universal joint 38' in the region of the knuckle joint 6, 7 of the trailer hitch (Fig. 2). The adaptation may extend to the character of apparatus for removing the crop from the soil, and even to the topping thereof. From such point on, as to the dropped beet root, such is received under the disclosure herein by the horizontal reach section 29 or the endless belt conveyor 25, with flights 26, of the disclosure herein. Also, at this stage, the cutoff beet tops may fall on the chute 31.

Under the disclosure herein, the location of the power takeoff shaft section near the deck of the harvester 2, is the power source for both elevator conveyors herein. For the lateral or side discharge location of the elevator conveyor 25, with flights 26, the power transmission connection directly from adjacent the base or deck of the harvester, is stable with adequate power source for elevator operation. The rear projection of this elevator conveyor 25, with flights 26, is located to be clear of the beet top removing chute 31 and thru the transmission stepped upward from the harvester deck by the sprocket chain 13 to the shaft 15.

The location of the power takeoff shaft direction at approximately alignment and in adjacent relation to the trailer hitch, minimizes haulage disturbance thereto. It is to be noted that incidental hereto, the tongue 8 is considerably off-center or to one side of the trailer at the hitch connection 6, 7. This is a factor in locating the pull for the side-frame provided hopper in a more balanced position as to such follower load. Furthermore, as to the power to the unloader elevator, it is more close to the mounting thereof on the hopper. With the drive chains 43', 47, taking the power to the conveyor 50, with flights 51, on opposite sides of the frame 33, this is a factor for stability in construction and operation.

What is claimed and it is desired to secure by Letters Patent is:

For association with a haulage and power supplying tractor, a trailing harvester having a deck, and crop disposal means for the harvester, said means comprising a hopper-providing cart, a pivot joint providing a trailer hitch directly connecting the cart to the harvester, said cart being spaced from the tractor by the harvester, there being an aft-extending power takeoff from the tractor to the harvester, a first endless conveyor mounted on the deck aft of the tractor, a first transmission connection on the harvester from the power takeoff to the first conveyor, a hopper emptying second conveyor mounted on the cart, said second conveyor having a horizontal reach first section providing a bottom for the hopper and therefrom an upwardly inclined elevator reach section extending to overhang laterally from the cart, said first conveyor extending aft from the deck and beyond the joint with first conveyor discharge directly upon the horizontal reach first section of the second conveyor, a second transmission connection extending from the power takeoff on the harvester to the second conveyor on the cart, said second transmission connection including a joint forward of the aft portion of the first conveyor and in proximity to the trailer hitch in conforming the second transmission connection to adapt to swinging of the cart in harvester transit, and a control on the harvester operable independently of tractor transit, for rendering said second conveyor operable whether or not the tractor and harvester be in transit, whereby the hopper cart may have discharge therefrom selective.

ALFRED B. LOWE.
RAYMOND A. LOWE.

References Cited in the file of this patent

UNITED STATES PATENTS

| Number | Name | Date |
|---|---|---|
| 709,723 | Ray | Sept. 23, 1902 |
| 908,739 | Buckwalter | Jan. 5, 1909 |
| 1,019,952 | Creger | Mar. 12, 1912 |
| 1,115,250 | Schrader | Oct. 27, 1914 |
| 1,385,939 | Burgess | July 26, 1921 |
| 1,455,914 | Hough | May 22, 1923 |
| 1,725,112 | Terao | Aug. 20, 1929 |
| 1,766,293 | Grimes | June 24, 1930 |
| 1,875,072 | Maryott | Aug. 30, 1932 |
| 1,945,119 | Metcalf | Jan. 30, 1934 |
| 2,343,153 | Miller | Feb. 29, 1944 |
| 2,383,412 | Orendorff | Aug. 21, 1945 |
| 2,404,629 | Griff | July 23, 1946 |
| 2,410,238 | Ringrose | Oct. 29, 1946 |
| 2,432,357 | Vars | Dec. 9, 1947 |
| 2,469,506 | Kerr et al. | May 10, 1949 |
| 2,496,472 | Huddle | Feb. 7, 1950 |
| 2,540,791 | Lowe et al. | Feb. 6, 1951 |